(12) United States Patent
Maison et al.

(10) Patent No.: US 6,613,258 B1
(45) Date of Patent: Sep. 2, 2003

(54) METHOD FOR MAKING PARTS IN COMPOSITE MATERIAL WITH THERMOPLASTIC MATRIX

(75) Inventors: Serge Maison, Puteaux (FR); Serge Meunier, Paris (FR); Cédric Thibout, Toulouse (FR); Luc Mouton, Vitrolles (FR); Hervé Payen, Velaur (FR); Philippe Vautey, Rueil Malmaison (FR); Carole Coiffier-Colas, Rueil Malmaison (FR); Joël Delbez, Merighac (FR)

(73) Assignee: Aerospatiale Societe Nationale Industrielle, Paris (FR)

( * ) Notice: Subject to any disclaimer, the term of this patent is extended or adjusted under 35 U.S.C. 154(b) by 0 days.

(21) Appl. No.: 09/462,748
(22) PCT Filed: Jul. 20, 1998
(86) PCT No.: PCT/FR98/01584
§ 371 (c)(1),
(2), (4) Date: May 3, 2000
(87) PCT Pub. No.: WO99/04952
PCT Pub. Date: Feb. 4, 1999

(30) Foreign Application Priority Data

Jul. 22, 1997 (FR) .............................. 97 09265

(51) Int. Cl.⁷ .................. B29C 65/40; B29C 70/32; B29C 51/02; B29C 53/04
(52) U.S. Cl. ............. 264/102; 264/160; 264/248; 264/250; 264/255; 264/257; 264/258; 264/310; 264/324; 264/339; 264/510; 264/511; 264/512; 156/189; 156/297
(58) Field of Search ................ 264/510, 511, 264/512, 102, 153, 250, 255, 257, 258, 339, 248, 160, 324, 310, 571; 156/166, 167, 168, 172, 173, 184, 192, 245, 189

(56) References Cited

U.S. PATENT DOCUMENTS

| | | | | |
|---|---|---|---|---|
| 3,300,355 A | | 1/1967 | Adams | |
| 3,906,308 A | * | 9/1975 | Amason et al. | 361/218 |
| 4,946,526 A | | 8/1990 | Petty-Galis et al. | |
| 4,963,215 A | * | 10/1990 | Ayers | 156/286 |
| 5,223,067 A | * | 6/1993 | Hamamoto et al. | 156/173 |
| 5,242,523 A | * | 9/1993 | Wilden et al. | 156/285 |
| 5,344,602 A | * | 9/1994 | Yencho | 264/258 |
| 5,362,347 A | | 11/1994 | Dominé | |
| 5,560,102 A | | 10/1996 | Micale et al. | |
| 5,586,391 A | | 12/1996 | Micale | |
| 5,593,633 A | * | 1/1997 | Dull et al. | 264/510 |

FOREIGN PATENT DOCUMENTS

| | | |
|---|---|---|
| DE | 40 17 978 A1 * | 12/1991 |
| EP | 0 344 721 | 12/1989 |
| EP | 0 444 627 | 9/1991 |
| GB | 2 225 742 | 6/1990 |

* cited by examiner

*Primary Examiner*—Stefan Staicovici
(74) *Attorney, Agent, or Firm*—Thelen Reid & Priest LLP; Robert E. Krebs

(57) ABSTRACT

A process is proposed for the fabrication of parts with large dimensions formed of a skin (10) and stiffeners (12, 16) such as aircraft fuselage segments made of a composite material with a thermoplastic matrix. After stiffeners have been made separately by lay-up, consolidation and shaping, these stiffeners are placed on a tooling (23) and the skin (10) is simultaneously fabricated and assembled to the stiffeners (12, 16) by diffusion welding. More precisely, the skin (10) is laid up and continuously consolidated by the lay-up head (36) such that the required part is obtained directly.

10 Claims, 3 Drawing Sheets

METHOD FOR MAKING PARTS IN COMPOSITE MATERIAL WITH THERMOPLASTIC MATRIX

DESCRIPTION

1. Technical field

The invention relates to a process for fabrication of parts with large dimensions comprising a skin and stiffeners, and a composite material with a thermoplastic matrix.

The process according to the invention may be used in many industrial sectors, if it is required to benefit from the inherent advantages of composite materials for making parts with large dimensions comprising a skin and add-on stiffeners. Thus in the aeronautical industry, the process according to the invention may be used in particular to make aircraft fuselage segments, aircraft jet engine shrouds, etc.

2. State of the Art

When it is required to make a thin envelope with good mechanical behavior but without excessively increasing its weight, that will be called a "skin" throughout the rest of the text, a frequent means of achieving this end is to use stiffeners such as rails, frames, local stiffeners, etc., added onto the skin.

In the past, this type of structure was always fully metallic, the skin being in the form of a sheet metal plate and the stiffeners being in the form of sheet metal plates or sections added onto the skin by fasteners such as rivets. Many metallic structures are still made in this way, particularly for parts with large dimensions. In particular in the aeronautical industry, aircraft fuselage segments and jet engine shrouds are always made in this way, particularly as described in documents US-A-5 560 102 and US-A5 586 381

In the last few years, an increasingly large number of metallic parts are being replaced by composite material parts formed of long fibers such as carbon fibers embedded in a resin matrix. This change is explained by the advantages specific to composite materials. In particular, these advantages include a weight saving of about 25% compared with comparable metallic parts, while the mechanical properties are similar to the properties of metallic parts and can be modified on request. Composite material parts also have good resistance to fatigue, no corrosion and excellent specific properties. The weight saving and the excellent mechanical properties of composite materials with long fibers embedded in a resin matrix explain the outstanding penetration of these materials in the aeronautical industry.

More precisely, the vast majority of composite material parts now used in the aeronautical industry are made from a thermosetting resin. Initially, this was the only type of resin that was capable of providing the required mechanical properties.

However, the fabrication of parts made from composite materials with a thermosetting resin has a significant disadvantage. Due to the thermosetting nature of the resin used, the fabrication of each part necessarily terminates with a relatively long polymerization operation, usually carried out in an autoclave.

This final operation is not particularly penalizing in the case of small parts. Small and relatively inexpensive autoclaves can be used and several parts can be polymerized in each autoclave at the same time.

On the other hand, when the size of parts is larger, only one part can be polymerized at any one time in the same autoclave, and very large and very expensive autoclaves must be used. The duration of the operation and the cost of the autoclave then quickly make the process unsuitable for industrial applications. This is why, although documents US-A-5 170 967 and US-A-5 223 067 envisage the use of a composite material with a thermosetting matrix for the fabrication of an aircraft fuselage segment, it is difficult to justify industrial production of large parts using this technology.

Since the relatively recent appearance of thermoplastic resins such as PEEK (Polyetheretherketone) resin that can be used to make composite materials with long fibers and with a thermoplastic matrix and that have mechanical properties equivalent to the mechanical properties of the most recent composite materials with a thermosetting matrix, there is a trend towards replacing existing metallic parts by parts made using a composite material with a thermoplastic matrix.

Apart from the advantages of composite materials with an organic matrix mentioned above, these composite materials with a thermoplastic matrix have good resistance to impact and fire and low moisture absorption. Finally, partly finished products can be kept at ambient temperature and have a practically unlimited life due to the fact that the resin that impregnates the threads is already polymerized.

As illustrated particularly in document US-A-5 362 347, it has already been suggested that the leading edge of an aircraft wing can be made using a composite material with a thermoplastic matrix. More precisely, this document describes that stiffeners and the skin can be made separately and then assembled by welding/diffusion.

Due to the fact that the stiffeners and the skin are made separately before being assembled, consolidation operations must be performed on the skin and—the stiffeners before they are assembled together. Remember that the main function of these consolidation operations is to create a bond between the various layers that form firstly the skin, and secondly each of the stiffeners, while eliminating pores. They consist of applying pressure on the element to be consolidated and heating it to a given temperature greater than the melting temperature of the resin. These consolidation operations are carried out in an autoclave. This makes this process unsuitable for the fabrication of parts with a skin with large dimensions, for the same reasons as mentioned above in the discussion for the fabrication of parts made of a composite material with a thermosetting matrix.

DESCRIPTION OF THE INVENTION

The purpose of this invention is precisely a process for making parts with large dimensions, such as aircraft fuselage segments, using a composite material with a thermoplastic matrix, in a particularly fast and inexpensive manner suitable for industrial fabrication at a relatively high rate, without any real limitation on the size due to the fact that neither the skin or the final structure obtained needs to be placed in an autoclave at the end of fabrication.

According to the invention, this result is achieved by means of a fabrication process for parts-with large dimensions, from a composite material comprising a skin and stiffeners, characterized by the fact that it comprises the following steps:

separate fabrication of stiffeners by lay-up, consolidation and shaping, starting from a strip of long fibers impregnated with thermoplastic resin;

placement of stiffeners on a tooling with a shape complementary to the shape of the part to be fabricated; and fabrication of the skin and simultaneous assembly of the skin and the stiffeners, by lay-up and continuous consolidation of at least one strip of long fibers impregnated with thermoplastic resin, directly on the tooling on which the stiffeners are placed.

Due to the fact that the stiffeners and the skin are assembled at the time of fabrication of the skin, and due to the fact that this fabrication includes continuous consolidation of a strip of fibers forming the skin at the time of its lay-up, parts with arbitrary dimensions can be made without it being necessary to place the skin or the part obtained in an autoclave.

Furthermore, the fabrication time for parts is particularly short, since the skin and stiffeners are assembled at the same time as the skin is fabricated. Furthermore, stiffeners in a given part may be made while the skin of the previous part is being fabricated.

In one preferred embodiment of the invention, stiffeners are made by continuously and automatically depositing a strip of long fibers impregnated with polymerized thermoplastic resin in order to form a panel, similar to a piece of sheet metallic in a conventional metallic part, by cutting blanks out of this panel, and then by consolidation and shaping of these blanks.

In general, the blanks are consolidated before they are shaped.

The blanks may be consolidated either in an autoclave or in a heating press. Note that consolidation in an autoclave or in a heating press then concerns relatively small parts, such that an ordinary autoclave or an ordinary heating press with conventional dimensions can be used and several blanks can be consolidated in the press simultaneously.

Furthermore, the blanks are preferably shaped by thermoforming. Thermoforming may be preceded by a bending operation if the fibers need to be well oriented in the stiffener.

In some particular cases, and particularly when the stiffeners have a relatively limited curvature compared with a plane, the blanks may be consolidated and shaped simultaneously by thermoforming in a heating press.

The process according to the invention is advantageously applied to the fabrication of a hollow part. Stiffeners are then placed in recesses formed on a mandrel forming part of the tooling, the lay-up is then done and the strip is continuously consolidated on this mandrel by rotating it around its axis.

In the special case in which the process according to the invention is applied to the fabrication of aircraft fuselage segments, stiffeners comprising rails, frames and local stiffeners are fabricated.

BRIEF DESCRIPTION OF THE DRAWINGS

We will now describe a preferred embodiment of the invention as a non-restrictive example, with reference to the attached drawings in which.

DETAILED DESCRIPTION OF A PREFERRED EMBODIMENT

Figure 1:
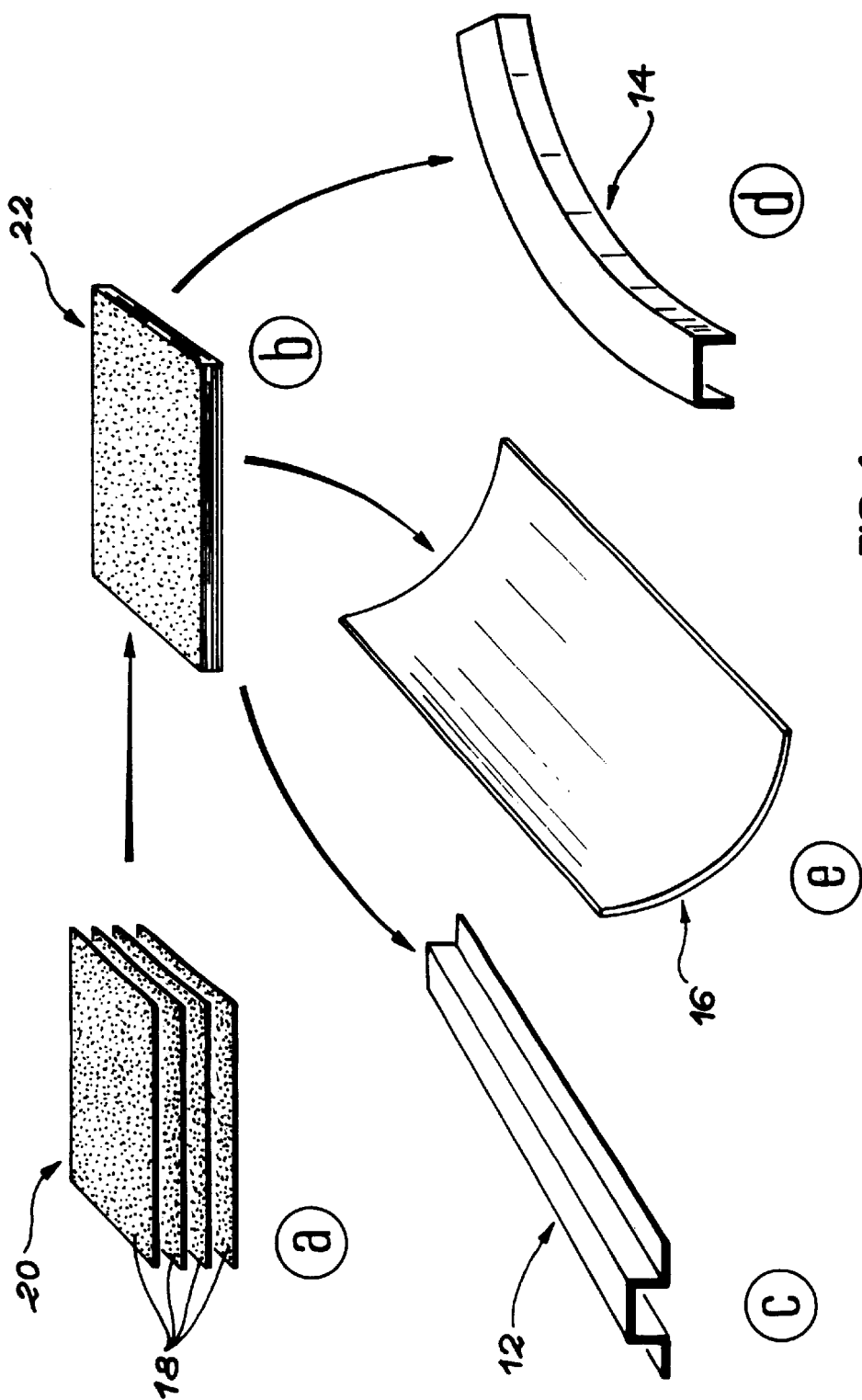
FIG. 1 diagrammatically illustrates a first step in the process according to the invention during which rails, local stiffeners and frames are fabricated separately.

The process according to the invention will now be described, in its application for the fabrication of an aircraft fuselage segment. As shown in particular in FIGS. 2 and 3, this type of fuselage segment comprises an outer skin 10 and stiffeners formed by rail 12, frames 14 and local stiffeners 16. The rails 12 and frames 14, oriented along the longitudinal and circumferential directions respectively, form the framework of the fuselage (FIG. 3) in the same way as when it is metallic. The local stiffeners 16 form overthicknesses that are added onto the skin 10 locally in order to reinforce it, particularly in areas around the windows 17 (FIG. 3).

However, this application must not be considered as being limitative. As already mentioned, the process according to the invention can be used to the fabrication of any type of parts with large dimensions made of a composite material with a thermoplastic matrix formed by the assembly of a skin and stiffeners. Consequently, the shape and dimensions of the part may be different, and the nature, number and layout of stiffeners may also vary. In particular, although the invention is particularly suitable for the fabrication of a hollow part of revolution, it may also be used for the fabrication of parts with different shapes, that are not shapes of revolution.

According to a first step in the fabrication process according to the invention, the stiffeners that are composed of rails 12, frames 14 and local stiffeners 16, are made separately by lay-up, consolidation and shaping, starting from a strip 18 of long fibers impregnated with a polymerized thermoplastic resin.

In practice, carbon fibers impregnated with PEEK (polyetheretherketone) resin are usually used. However, fibers and/or a thermoplastic resin with different natures may be used in some applications, without going outside the framework of the invention.

A strip 18 formed of unidirectional fibers bonded together by the polymerized thermoplastic resin is usually used. However, as a variant, a strip of woven fibers, also impregnated with polymerized resin, may be used in some cases. At ambient temperature, the layer 18 of fibers impregnated with polymerized thermoplastic resin is a flexible and non-bonding strip, and is usually stored on a roll.

The lay-up step of the strip 18, illustrated diagrammatically in a in FIG. 1, consists of depositing several thicknesses of the strip 18 to form a number of layers or plies, with orientations that may or may not be different in different plies, in order to take account of the mechanical properties that are to be obtained. The number of superposed plies during this lay-up step also depends on the mechanical characteristics required for the stiffeners 12, 14 and 16.

The lay-up step illustrated in a in FIG. 1 may be common to all stiffeners formed by rails 12, frames 14 and local stiffeners 16, or it may be specific to each of these stiffeners, depending on whether or not these elements need to have the same thickness. The strip 18 may also be the same for all stiffeners, or it may be different for some of them.

Depending on the case, one or several types of flat panels 20 can thus be made by lay-up.

The lay-up operation for the strip 18, starting from the roll (not shown) on which the material is wound, is preferably carried out using a lay-up head (not shown) adapted to laying up a strip formed of long fibers impregnated with polymerized thermoplastic resin. This is advantageously done by using the high speed lay-up head described in French patent application No. 96 14799.

The lay-up head heats the strip 18 to a temperature higher than the resin melting temperature, and pressure is then applied on the deposited strip to weld it by diffusion onto the previously deposited strip. The lay-up head then cools the strip immediately after its application in order to prevent it from separating again. Furthermore, means may be provided for precise positioning of the strips with respect to each other.

The lay-up head deposits the strip 18 on a flat and usually fixed support. Therefore the panel(s) 20 obtained by this lay-up operation are flat panels, preferably with large dimensions, that can be made continuously within the framework of an industrial process.

Blanks 22 are cut out from the panel(s) 20, either while these panels are being fabricated, or later. The cuts are made so as to produce blanks with dimensions adapted to the dimensions of the stiffeners 12, 14 and 16 that are to be fabricated. These dimensions may also be slightly larger if trimming is necessary after the stiffeners have been shaped.

As shown diagrammatically in b in FIG. 1, a consolidation operation is then carried out on the blanks 22 cut out in the panel(s) 20, with the main purpose of eliminating pores inside the material and improving the bond between the various component layers.

This consolidation operation is characterized by applying pressure on the blanks 22 (usually between 2 and 20 bars depending on the type of material used) and by heating them to a temperature usually greater than the resin melting temperature in order to soften the resin (for example about 400° C. in the case of a PEEK resin).

The blanks 22 may be consolidated in an autoclave or in a heating press.

Note that if the consolidation takes place in an autoclave, the autoclaves used are conventional autoclaves with conventional dimensions since the dimensions of the blanks 22 to be consolidated correspond to the dimensions of the stiffeners of the part to be fabricated before these elements are shaped. Several blanks 22 can usually be consolidated in the same autoclave, which can result in a considerable time and cost saving.

As a variant the blanks 22 may also be consolidated in a heating press like that described in document EP-A-0 584 017.

The various consolidated blanks 22 are then shaped separately as shown diagrammatically in c, d and e respectively for rails 12, frames 14 and local stiffeners 16.

As shown diagrammatically in c in FIG. 1, the rails 12 are straight or approximately straight sections, with an approximately omega shaped cross-section. Straight sections with different cross-sections, for example L, Z or U cross-sections, may be fabricated in the same way to be integrated into the final part.

Stiffeners such as rails 12 are shaped by thermoforming, for example in a heating press type machine equipped with a punch and a matrix, or a punch and a bag. Thermoforming techniques for shaping parts made of a composite material with a thermoplastic matrix are well known, consequently no detailed description will be made of them herein.

As diagrammatically illustrated in d in FIG. 1, stiffeners such as local stiffeners 16 composed of panel segments only slightly curved with respect to a plane, may also be made by thermoforming, particularly between a punch and a bag, starting from previously consolidated flat blanks 22. In particular, shaping may be done in a heating press similar to the heating press described in document EP-A-0 584 017, mentioned above.

Considering the small curvature of local stiffeners 16, the consolidation and shaping steps of these stiffeners may also take place simultaneously. The flat blanks 22 cut out from the panel 20 are then placed directly in a heating press that performs these two functions simultaneously. Once again, a heating press similar to the heating press described in document EP-A-0 584 017 may be used.

As shown diagrammatically in e in FIG. 1, stiffeners such as the frames 14 are sections bent into the shape of a circle or an arc of a circle. In the embodiment shown, these sections have a U-shaped cross-section. Any other cross-section, for example an L-shaped cross-section, may be envisaged without going outside the framework of the invention.

In order to obtain a circular element starting from a flat blank 22 initially in the form of a straight strip, this blank must firstly be bent in its plane to ensure continuity of fibers around the entire circumference of the element. In particular, this bending may be done using equipment similar to that described in document FR-A-2 635 484, after this equipment has been adapted to take account of the thermoplastic nature of the resin used. This adaptation is done particularly by the addition of heating means, on the input side of the conical rollers that bend the strip.

When the blank 22 in the form of a strip has been bent in its plane, this blank is shaped by thermoforming, either between a punch and a die or between a punch and a bag, in the same way as rails 12 may be shaped as described above.

It is important to observe that the various lay-up, consolidation and shaping operations forming the first step in the fabrication of the stiffeners 12, 14 and 16 that have just been described above, may be carried out simultaneously within the framework of a process for mass fabrication of fuselage segments.

Figure 2:
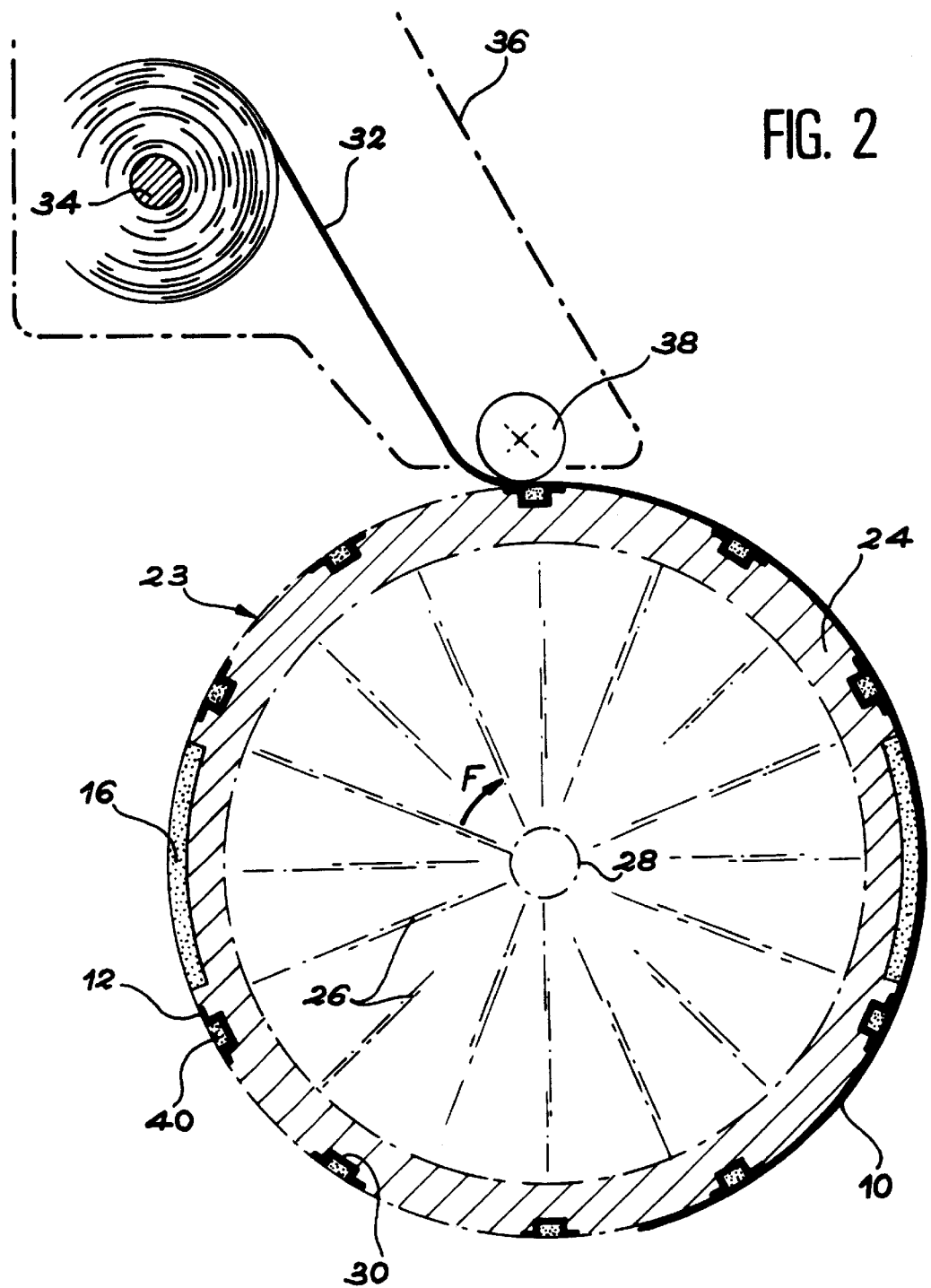
FIG. 2 is a transverse sectional view that diagrammatically shows the final step of the process according to the invention during which the skin is fabricated at the same time as it is assembled with stiffeners.
Figure 3:
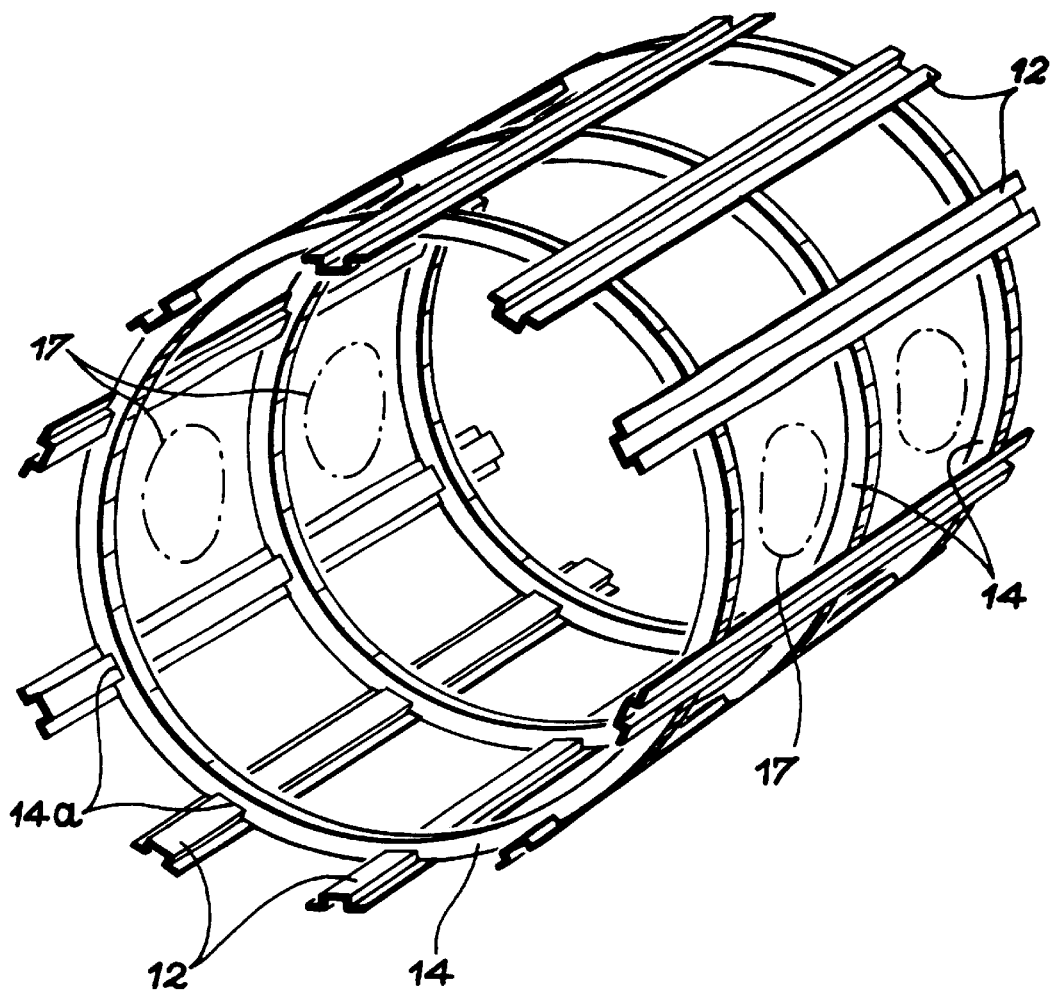
FIG. 3 is a perspective view illustrating the relative layout of rails and frames in the fuselage segment that is to be fabricated.

When the rails 12, local stiffeners 16 and frames 14 necessary for the fabrication of a fuselage segment available, all these stiffeners are placed on a tooling 23 as shown diagrammatically in FIG. 2.

More precisely, the tooling 23 comprises a hollow mandrel 24, for example a metallic mandrel, in which the shape of the outer surface is complementary to the shape of the lower surface of the skin 10 of the fuselage segment to be fabricated. A circular mandrel 24 has been shown in FIG. 2, to simplify the description.

As is shown very diagrammatically, the hollow mandrel 24 is mounted on spokes 26 that connect it to a central hub 28 through which the mandrel may be driven in rotation in the direction of the arrow F in FIG. 2. This rotational drive may be provided by any appropriate means for rotating mandrel 24 at a controlled and relatively low constant speed.

On its outside surface, the mandrel 24 comprises recesses 30, the shapes of which are complementary to the shapes of the various stiffeners 12, 14 and 16. Thus, when the rails 12, frames 14 and local stiffeners 16 are placed in these recesses 30, all these stiffeners are flush with the outside surface of the mandrel 24 between the recesses 30.

As shown diagrammatically in FIG. 3, it is possible to assemble the rails 12 and the intersecting frames 14 due to the fact that the notches 14a are formed, for example in the frames 14, at the locations at which these stiffeners cross. Notches 14a are formed before the rails 12 and the frames 14 are put into place in the recesses 30.

The stiffeners may be held in place in recesses 30 by any appropriate means such as double-sided adhesive tape, glue dabs or by suction, etc., such that subsequent disassembly is easy. The mandrel 24 itself can be removed to facilitate this disassembly. Consequently, it may be formed of several sectors assembled together and that can be disassembled, or it may be retractable into itself, or using any other means that facilitate disassembly of the part when it is finished.

As shown in FIG. 2, some stiffeners (in this case the rails 12) have hollow parts facing outwards when these elements are placed in recesses 30. Preferably, cores 40 are placed in these hollow parts to prevent deformation of the skin 10 while it is being fabricated. Cores 40 made of a material that can easily be destroyed or disassembled when the part is finished (for example soluble cores) are used using techniques similar to techniques used for casting.

When all stiffeners used in the composition of a fuselage segment have been placed in the recesses 30, the next step in the process may be started as shown in FIG. 2. During this step, the skin 10 is fabricated at the same time as this skin and stiffeners 12, 14 and 16 are assembled by lay-up and continuous consolidation of a strip 32 of long fibers impregnated with polymerized thermoplastic resin, directly on the mandrel 24 on which these stiffeners are fitted.

The nature of the strip 32 with long fibers impregnated with resin is usually the same as the nature of the strip that was used for the fabrication of rails 12, frames 14 and local stiffeners 16. Thus, it is usually a carbon fiber strip impregnated with PEEK (polyetheretherketone) resin that has already been polymerized. However, note that in some specific applications, the composite material forming the skin 10 may be different from the material from which the stiffeners are made.

As shown diagrammatically in FIG. 2, the lay-up and continuous consolidation operation is carried out starting from a strip 32 initially wound on a reel 34. Lay-up and continuous consolidation are performed using a lay-up head illustrated diagrammatically in 36. This lay-up head 36 is mounted on a support (not shown) so that it moves progressively parallel to the axis of the mandrel 24. When the mandrel is driven in rotation in the direction of the arrow F, the strip 32 is wound in a spiral around the mandrel, according to a lay-up sequence defined so as to progressively form the skin 10 of the part. The strip 32 may also be deposited parallel to the axis of the mandrel 24.

Note that any other relative movement between the lay-up head 36 and the mandrel 24 may be adopted in order to form the skin 10, without going outside the framework of the invention.

The lay-up head 36 is designed to simultaneously lay-up the strip 32 on the mandrel 24, to continuously consolidate the skin 10 thus fabricated, and to assemble this skin 10 and the stiffeners formed by the rails 12, frames 14 and local stiffeners 16. Consequently, the lay-up head 36 applies a predetermined pressure and temperature cycle to the material. This cycle includes heating of the strip 32 immediately before its application on mandrel 24, application of a pressure on strip 32 when the strip is applied onto the mandrel, followed by cooling of the strip that has just been deposited.

The strip 32 is heated in advance to a temperature greater than the resin melting temperature, to make the resin sufficiently fluid to weld the various layer deposited layers together by diffusion and 25% to facilitate the elimination of pores. As an example, which is in no way restrictive, a temperature of about 400° C. may be used for a PEEK resin.

The strip 32 is applied in contact with the mandrel 24, for example by a roll 38, at a pressure usually between 2 and 20 bars depending on the material type used.

The deposited strip is subsequently cooled to prevent it from separating again. The objective is to lower the temperature of the strip below the resin melting temperature and if possible below its vitreous transition temperature.

When the required number of layers for the skin 10 has been obtained, rotation of the mandrel 24 is stopped and the strip 32 is cut. The skin 10 is then already consolidated and welded by diffusion to the stiffeners, in this case consisting of the rails 12, frames 14 and local stiffeners 16.

Consequently, the fuselage segment is obtained immediately after disassembly or retraction of the mandrel 24 and removal of the cores 40 placed inside the rails 12. In particular, the fuselage segment thus obtained does not need to be placed in the autoclave afterwards.

In one extension to the process according to the invention, the frame (not shown) that supports the mandrel 24 and the lay-up head 36 may also be used, if necessary, to incorporate lightning protection into the skin of the structure, and at least partly perform finishing operations such as deposition of a primary coating on which paint can be applied.

The above description shows that the process according to the invention can be used to fabricate parts with large dimensions made of composite material with a thermoplastic matrix formed by the assembly of a skin and stiffeners, practically without any size limitation, industrially and at low cost. A large number of normally metallic parts can thus be made from composite material, so that the advantages specific to these materials can be obtained.

Note that the process according to the invention does not prevent subsequent addition of other stiffeners or other elements made of different and particularly metallic materials when fabrication techniques using composite materials with a thermoplastic matrix cannot be used, or are too expensive to use, for the fabrication of these elements.

What is claimed is:

1. Fabrication process for parts from a composite material comprising a skin and stiffeners, the process comprising:

separately fabricating stiffeners by lay-up, consolidation and shaping, starting from a strip of long fibers impregnated with thermoplastic resin;

placing the stiffeners on a tooling with a shape complementary to the shape of the part to be fabricated;

simultaneously fabricating and assembling the skin with the stiffeners by lay-up and continuous consolidation of strips of long fibers impregnated with thermoplastic resin, directly on the tooling on which the stiffeners are placed; and cooling a strip that has just been deposited to a temperature below the melting temperature of the thermoplastic resin, prior to adding an additional strip heated at a temperature above the melting temperature of the thermoplastic resin to weld the strips together by diffusion.

2. Process according to claim 1, in which the stiffeners are made by continuously and automatically depositing a strip long fibers impregnated with thermoplastic resin in order to form a panel, by cutting blacks out of this panel, and then by consolidation and shaping of theses blanks.

3. Process according to claim 2, in which the blanks are consolidated before they are shaped.

4. Process according to claim 2, which the blanks are consolidated in an autoclave or in heating press.

5. Process according to claim 2, in which the blanks are shaped by thermoforming.

6. Process according to claim 5, in witch the blanks are bent before they are shaped by thermoforming.

7. Process according to claim 2, in which the blanks are consolidated and shaped simultaneously by thermoforming, in a heating press.

8. Process according to claim 1, applied to the fabrication of a hollow part, in which the stiffeners are placed in recesses formed on a mandrel forming part of the tooling, and in which the lay-up is then done and the strip is continuously consolidated on this mandrel by rotating the mandrel around its axis.

9. Process according to claim 8, applied to the fabrication of aircraft fuselage segments, in which stiffeners comprising rails, frames and local stiffeners are fabricated.

10. Process according to claim 1, in which lightning protection is then integrated into the skin.

* * * * *